US007880842B2

(12) United States Patent
Saitoh et al.

(10) Patent No.: US 7,880,842 B2
(45) Date of Patent: Feb. 1, 2011

(54) LIQUID-CRYSTAL DISPLAY DEVICE HAVING LIQUID CRYSTAL CELL WITH PLURAL DOMAINS

(75) Inventors: Yukito Saitoh, Minami-ashigara (JP); Yusuke Ohashi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 170 days.

(21) Appl. No.: 12/051,558

(22) Filed: Mar. 19, 2008

(65) Prior Publication Data

US 2008/0231784 A1    Sep. 25, 2008

(30) Foreign Application Priority Data

Mar. 20, 2007  (JP) .............................. 2007-072219
Mar. 3, 2008   (JP) .............................. 2008-051547

(51) Int. Cl.
  *G02F 1/1335* (2006.01)
(52) U.S. Cl. ..................................................... 349/119
(58) Field of Classification Search ................. 349/119, 349/120
  See application file for complete search history.

(56) References Cited

U.S. PATENT DOCUMENTS 6,169,590 B1 * 1/2001 Abileah et al. ............. 349/120
6,299,949 B1 * 10/2001 Shioda et al. ................ 428/1.5
2001/0019383 A1 * 9/2001 Shin et al. ................... 349/106
2005/0179842 A1 * 8/2005 Ichihashi .................... 349/117
2006/0001798 A1   1/2006 Jang et al.
2006/0192912 A1 * 8/2006 Itou et al. ................... 349/114
2007/0070276 A1 * 3/2007 Tan et al. .................... 349/117

FOREIGN PATENT DOCUMENTS

JP    2006-018285 A    1/2006

OTHER PUBLICATIONS

M. S. El-Bahrawi, N. N. Nagib, S. A. Khodier, H. M. Sidki, Birefringence of muscovite mica, Optics & Laser Technology, vol. 30, Issues 6-7, Sep. 10, 1998, pp. 411-415, ISSN 0030-3992, DOI: 10.1016/S0030-3992(98)00074-7. Accessed from http://www.sciencedirect.com/science/article/B6V4H-3W087FK-9/2/a6f8d819fcf51fe697a7307db8d9b2d2 on May 14, 2010.*

* cited by examiner

*Primary Examiner*—Mark A Robinson
*Assistant Examiner*—Michael Inadomi
(74) *Attorney, Agent, or Firm*—Buchanan Ingersoll & Rooney PC

(57) ABSTRACT

A liquid-crystal display device comprising a liquid-crystal cell with plural domains and a transparent film comprising at least two domains that differ in in-plane retardation (Re) and/or thickness-direction retardation (Rth) for a visible light wavelength $\lambda$ nm is disclosed. The domains of the transparent film and the domains of the liquid-crystal cell have no correlation in terms of their arrangement and/or size.

3 Claims, 4 Drawing Sheets

Fig. 1A
Fig. 1B
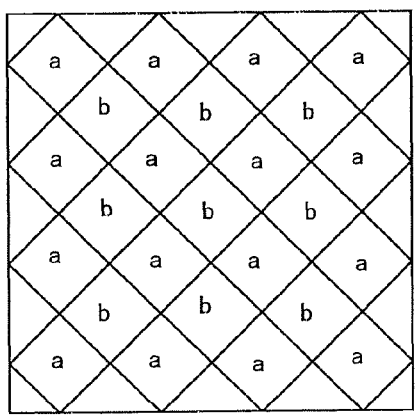
Fig. 1C
Fig. 1D
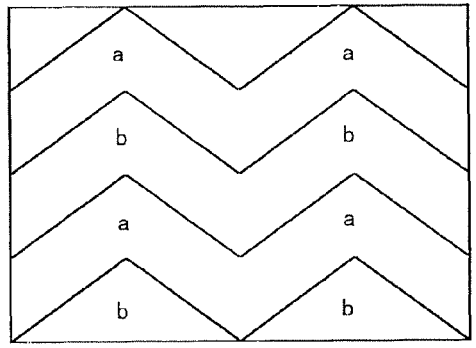

LIQUID-CRYSTAL DISPLAY DEVICE HAVING LIQUID CRYSTAL CELL WITH PLURAL DOMAINS

CROSS-REFERENCE TO RELATED APPLICATIONS

This application claims benefit of priority under 35 U.S.C. 119 to Japanese Patent Application Nos. 2007-072219 filed on Mar. 20, 2007 and 2008-051547 filed on Mar. 3, 2008, and the entire contents of the applications are incorporated herein by reference.

BACKGROUND OF THE INVENTION

1. Field of the Invention

The present invention relates to a liquid-crystal display device, and to a transparent film used as an optical compensatory film or the like in liquid-crystal display devices, etc.

2. Related Art

A liquid-crystal display device is used in various applications, as having the advantage that it is thin and lightweight. On the other hand, however, the liquid-crystal display device has a problem in that its viewing angle is narrow since the birefringence of the liquid-crystal cell therein varies depending on the viewing direction.

As one system improved in terms of viewing angle characteristics, a multi-domain system has been proposed, in which multiple domains differing in the alignment direction of the liquid-crystal molecules and in the rising direction of the liquid-crystal molecules during voltage application are formed in each pixel of the liquid-crystal cell. A liquid crystal cell with multi-domain structures can exhibit wide viewing angle characteristics since the difference depending on in which direction it is observed is reduced.

However, when it is observed in an oblique direction, not only the birefringence of a liquid-crystal cell may change but also the transmission axis of a pair of polarizers may shift from a perpendicular direction. As a result, when it is observed in an oblique direction, there may occur some problems of light leakage and color shift in the black state.

As a liquid-crystal display device capable of reducing the light leakage in the black state, JPA No. 2006-18285 has proposed a liquid-crystal display a liquid crystal panel comprising two substrates placed opposite to each other and a liquid crystal layer formed between the substrates, and equipped with a plurality of pixels, wherein each of the pixels is defined with at least two domains having different alignment characteristics; and the compensation film compensating for optical characteristics in a direction corresponding to a liquid crystal alignment direction of each of the domains.

The liquid-crystal display device described in JPA No. 2006-18285 comprises a compensatory film that compensates the optical characteristics in the direction corresponding to the liquid-crystal alignment direction of each domain of the liquid-crystal cell. For constructing the liquid-crystal display device of the type, for example, a compensatory film having a different retardation in the in-plane region in accordance with each domain of the liquid-crystal cell is fabricated, and the compensatory film is stuck to the liquid-crystal cell with micron-level positioning accuracy at every domain in the cell. However, such positioning technique is difficult, and is unsuitable to industrial scale mass-production.

Even in a liquid-crystal display device without multi-domain structures, plural domains with one pixel unit are formed in the liquid-crystal cell, and one pixel is divided into individual RGB domains of a color filter. Heretofore, for reducing the color shift in an oblique direction, it has been proposed to control the optical characteristics of a compensatory film in accordance with the respective wavelengths of RGB of a color filter. Like the above, however, the method is unfavorable in terms of the producibility, since the production process may require micron-level positioning accuracy or may require a micropatterning technique.

SUMMARY OF THE INVENTION

One object of the present invention is to provide a liquid-crystal display device that is excellent in the production aptitude and is excellent in the viewing angle characteristics (especially in that the color shift and the light leakage in the black state are small).

In one aspect, the invention provides a liquid-crystal display device comprising a liquid-crystal cell with plural domains and a transparent film comprising at least two domains that differ in in-plane retardation (Re) and/or thickness-direction retardation (Rth) for a visible light wavelength λ nm, wherein the domains of the transparent film and the domains of the liquid-crystal cell have no correlation in terms of their arrangement and/or size.

The domains of the transparent film may be aligned in a lattice-like or a zigzag-like arrangement.

The smallest diameter of the domains of the transparent film may fall within the range from 1 μm to 300 μm.

In one embodiment of the invention, Re and Rth of the domains of the transparent film at a visible light wavelength λ nm are within a range of the mean value ±20% of Re and Rth, respectively, of the transparent film at the same wavelength.

The transparent film may comprise plural domains having Re at a visible light wavelength λ nm of from 40 to 50 nm, and plural domains having Re at the same wavelength of from 50 to 60 nm.

The transparent film may comprise plural domains having Rth at a visible light wavelength λ nm of from 180 to 200 nm, and plural domains having Rth at the same wavelength of from 200 to 220 nm.

In another aspect, the invention provides a transparent film comprising at least two domains that differ in the in-plane retardation (Re) and/or the thickness-direction retardation (Rth) for a visible light wavelength λ nm, wherein the smallest diameter of the domains is from 1 to 300 μm.

BRIEF DESCRIPTION OF THE DRAWINGS

FIGS. 1A, 1B, 1C and 1D each show a top view of an example of a transparent film usable in the liquid-crystal display device of the invention.

Figure 2:
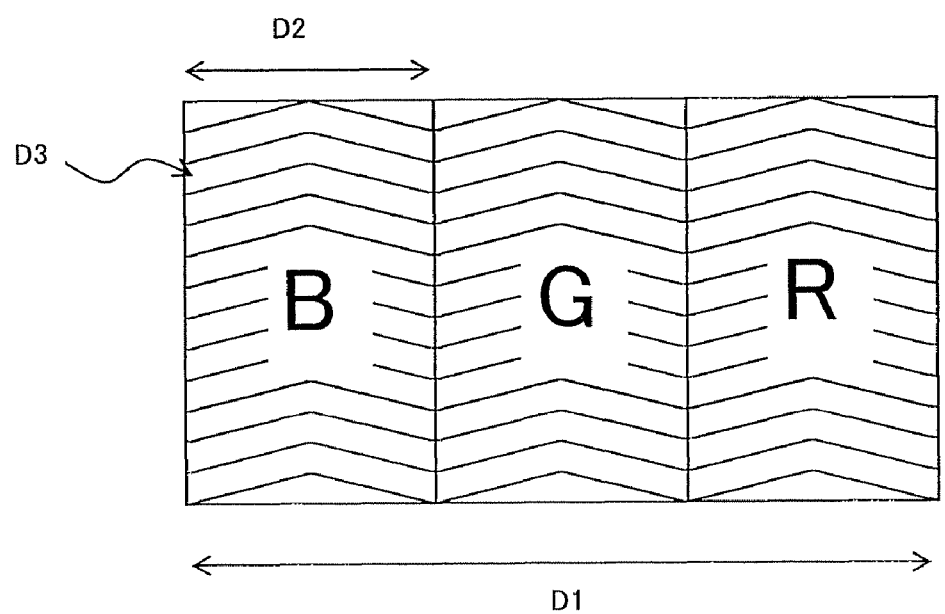
FIG. 2 shows a top view of a domain case having a unit of one pixel in a liquid-crystal cell.

In the drawings, the numeral references and the signs have the following meanings.

10 Transparent Film
12 Liquid-Crystal Cell
a, b Transparent Film Domain
D1, D2, D3 Liquid-Crystal Cell Domain

DETAILED DESCRIPTION OF THE INVENTION

The invention is described in detail hereinunder. The expression "from a lower value to an upper value" referred herein means that the range intended by the expression includes both the lower value and the upper value.

At first, the definitions of "Re(λ)" and "Rth(λ)" are explained.

(Measurement of Re(λ) and Rth(λ))

In the description, Re(λ) and Rth(λ) each indicate the in-plane retardation and the thickness direction retardation of the film at a wavelength λ. Re(λ) is measured by applying a light having a wavelength of λ nm in the normal direction of the film, using KOBRA-21ADH or WR (by Oji Scientific Instruments). The selectivity of the measurement wavelength λ nm may be conducted by a manual exchange of a wavelength-filter, a program conversion of a measurement wavelength value or the like.

When the film tested is represented by an uniaxial or biaxial refractive index ellipsoid, then its Rth(λ) is calculate according to the method mentioned below.

With the in-plane slow axis (determined by KOBRA 21ADH or WR) taken as the inclination axis (rotation axis) of the film (in case where the film has no slow axis, the rotation axis of the film may be in any in-plane direction of the film), Re(λ) of the film is measured at 6 points in all thereof, up to +50° relative to the normal direction of the film at intervals of 10°, by applying a light having a wavelength of λ nm from the inclined direction of the film.

With the in-plane slow axis from the normal direction taken as the rotation axis thereof, when the film has a zero retardation value at a certain inclination angle, then the symbol of the retardation value of the film at an inclination angle larger than that inclination angle is changed to a negative one, and then applied to KOBRA 21ADH or WR for computation.

With the slow axis taken as the inclination axis (rotation axis) (in case where the film has no slow axis, the rotation axis of the film may be in any in-plane direction of the film), the retardation values of the film are measured in any inclined two directions; and based on the data and the mean refractive index and the inputted film thickness, Rth may be calculated according to the following formulae (1) and (2):

$$Re(\theta) = \left[ nx - \frac{ny \times nz}{\sqrt{\left\{ny \sin\left(\sin^{-1}\left(\frac{\sin(-\theta)}{nx}\right)\right)\right\}^2 + \left\{nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (1)$$

$$Rth = ((nx + ny)/2 - nz) \times d \quad (2)$$

wherein Re(θ) means the retardation value of the film in the direction inclined by an angle θ from the normal direction; nx means the in-plane refractive index of the film in the slow axis direction; ny means the in-plane refractive index of the film in the direction vertical to nx; nz means the refractive index of the film vertical to nx and ny; and d is a thickness of a sample.

When the film to be tested could not be represented by a monoaxial or biaxial index ellipsoid, or that is, when the film does not have an optical axis, then its Rth(λ) may be calculated according to the method mentioned below.

With the in-plane slow axis (determined by KOBRA 21ADH or WR) taken as the inclination axis (rotation axis) of the film, Re(λ) of the film is measured at 11 points in all thereof, from −50° to +50° relative to the normal direction of the film at intervals of 10°, by applying a light having a wavelength of λ nm from the inclined direction of the film. Based on the thus-determined retardation data of Re(λ), the mean refractive index and the inputted film thickness, Rth(λ) of the film is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59). The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

Unless otherwise specifically indicated in this description, the wavelength λ nm in a visible light range is 550 nm.

The invention relates to a liquid-crystal display device comprising a liquid-crystal cell with plural domains and a transparent film comprising at least two domains that differ in in-plane retardation (Re) and/or thickness-direction retardation (Rth) for a visible light wavelength λ nm. And the domains of the transparent film and the domains of the liquid-crystal cell have no correlation at least in terms of their arrangement and/or size.

The transparent film to be used in the invention comprises at least two domains differing in Re and/or Rth for a visible light wavelength λ nm. And according to the invention, the domains of the transparent film and the domains of the liquid-crystal cell are combined so as to have no correlation in terms of their arrangement and/or size, thereby improving the viewing angle characteristics of the display device. In the invention, the film may be incorporated into a liquid-crystal display device without any positioning of the domains of the liquid-crystal cell and the domains of the film; and therefore, a liquid-crystal display device having excellent viewing angle characteristics may be provided without any complicated production step.

Examples of the transparent film to be used in the invention include an embodiment comprising domains a and domains b that differ in their Re and/or Rth, in which the plural domains a and the plural domains b are aligned at random; and an embodiment comprising them as aligned under a predetermined pattern. In general, the domains of a liquid-crystal cell are aligned under a predetermined pattern, and when the former embodiment where the domains are aligned at random is utilized, then it is favorable since they may have no correlation with the domains of a liquid-crystal cell irrespective of the alignment pattern and the size of the domains of the liquid-crystal cell. On the other hand, the latter embodiment where the domains a and b are aligned under a predetermined pattern is favorable in terms of that it may be constructed by using any already-existing equipment and according to a conventional method and that the optical characteristics of the film can be readily controlled as a whole. The latter embodiment may be combined with a liquid-crystal cell that differs from it in the size and/or the arrangement pattern of the constitutive domains.

The arrangement and the alignment pattern of the domains of the transparent film are not specifically defined. FIG. 1 shows top views of some examples of a transparent film usable in the liquid-crystal display device of the invention.

The transparent film of FIG. 1A is an embodiment where square domains a and b are aligned in a zigzag-like arrangement; FIG. 1B is an embodiment where square domains a and b are aligned in a lattice-like arrangement. As in FIG. 1C, the domains a and the domains b may be rectangular domains. As in FIG. 1D, the domains a and the domains b may have a bent form.

The domains a and the domains b differ in Re and/or Rth for a visible light wavelength λ nm. In case where the transparent film of this embodiment is used as an optical compensatory film in a liquid-crystal display device employing any mode, the transparent film is required as a whole to have Re and Rth necessary for optically compensating birefringence of the liquid-crystal display device. In this embodiment, it is desirable that both Re and Rth of the domains a and the domains b at a visible light wavelength λ nm of the transparent film are within a range of the mean value ±20% of Re and Rth, respectively, of the transparent film at the same wavelength, more preferably within a range of the mean value ±10%, even more preferably within a range of the mean value ±5%. On the other hand, when the difference between Re1 and/or Rth1 of the domains a and Re2 and/or Rth2 of the domains b is too small, then the viewing angle characteristics-improving effect to be attained by the coexistence of the domains a and the domains b may be insufficient. Preferably, |Re1−Re2| is equal to or more than 5% of the mean value of Re, more preferably from 5 to 20%, even more preferably from 5 to 10%. Similarly, |Rth1−Rth2| is preferably equal to or more than 5% of the mean value of Rth, more preferably from 5 to 20%, even more preferably from 5 to 10%. When the mean value of Re and Rth of the transparent film and Re and Rth of the constitutive domains satisfy the above-mentioned relation, then it brings about both the viewing angle characteristics-improving effect by the coexistence of the domains a and the domains b that differ in their Re and/or Rth and the optical compensatory effect of the transparent film.

The mean value of Re and Rth of the transparent film is a value of Re and Rth of the entire film to be measured according to the above-mentioned method. Re and Rth of the domains of the transparent film may be measured, using a microscopic retardation meter. One example of the device is MEIRYO TECHNICA CORPORATION's "LCA-LU4".

In an embodiment of a VA-mode liquid-crystal display device, it is desirable that Re of the domains a at a visible light wavelength λ nm of the transparent film is from 40 to 50 nm, and that Re of the domains b at the same wavelength is from 50 to 60 nm. In the embodiment of a VA-mode liquid-crystal display device, it is also desirable that Rth of the domains a at a visible light wavelength λ nm of the transparent film is from 180 to 200 nm, and that Rth of the domains b at the same wavelength is from 200 to 220 nm. More preferred is a combination of the two; or that is, in a VA-mode liquid-crystal display device, it is more desirable that Re of the domains a at a visible light wavelength λ nm is from 40 to 50 nm, that Rth thereof is from 180 to 200 nm, that Re of the domains b at the same wavelength is from 50 to 60 nm and that Rth thereof is from 200 to 220 nm.

According to the invention, a liquid-crystal cell with plural domains is employed. Examples of the liquid-crystal cell with plural domains are not limited to embodiments of a multi-domain-type liquid-crystal cell, and include any embodiments of an ordinary liquid-crystal cell with plural pixels or with plural sub-pixels. For example, as shown in FIG. 2, even a liquid-crystal cell not employing a multidomain system has plural domains D1, each of which is a pixel, therein; and each pixel D1 has RGB color (sub-pixel) domains D2 of a color filter therein. Further, according to a multi-domain embodiment, each of the sub-pixels has plural domains D3 therein. In the description, the term "plural domains of a liquid-crystal cell" may be any of D1, D2 and D3. Specifically, in the embodiment having a liquid-crystal cell of FIG. 1, the domains of the transparent film are not similar to any of the domains D1, D2 and D3 of the liquid-crystal cell in terms of the arrangement pattern; or even though the arrangement pattern is the same or similar between them, they have no correlation as a whole since the size of each domain differs between them.

Figure 3:
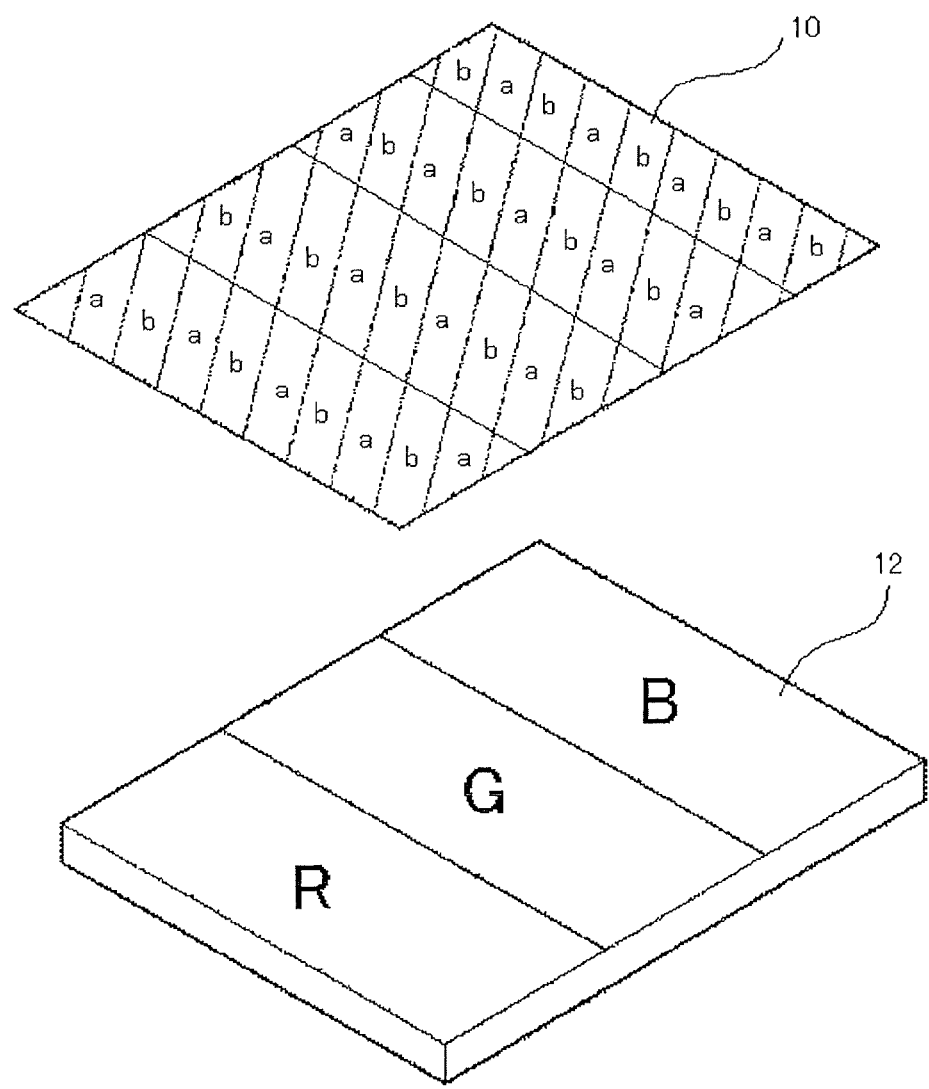
FIG. 3 is a view schematically showing one example of a combination of a transparent film and a liquid-crystal cell in the liquid-crystal display device of the invention.

FIG. 3 is a view schematically showing one example of a combination of a transparent film 10 and a liquid-crystal cell 12. The transparent film 10 comprises plural domains a and b that differ in Re and/or Rth. The liquid-crystal cell 12 in FIG. 3 is to show a part of one pixel, which comprises RGB sub-pixels. In the transparent film 10, the domains a and b are regularly aligned in a lattice-like arrangement, but the pitch of the regularity, or that is, the size of the domains a and b differs from both the pixel and the sub-pixel RGB, and therefore, as a whole the former domains do not correspond to both the pixel and the sub-pixel of the liquid-crystal cell.

Figure 4:
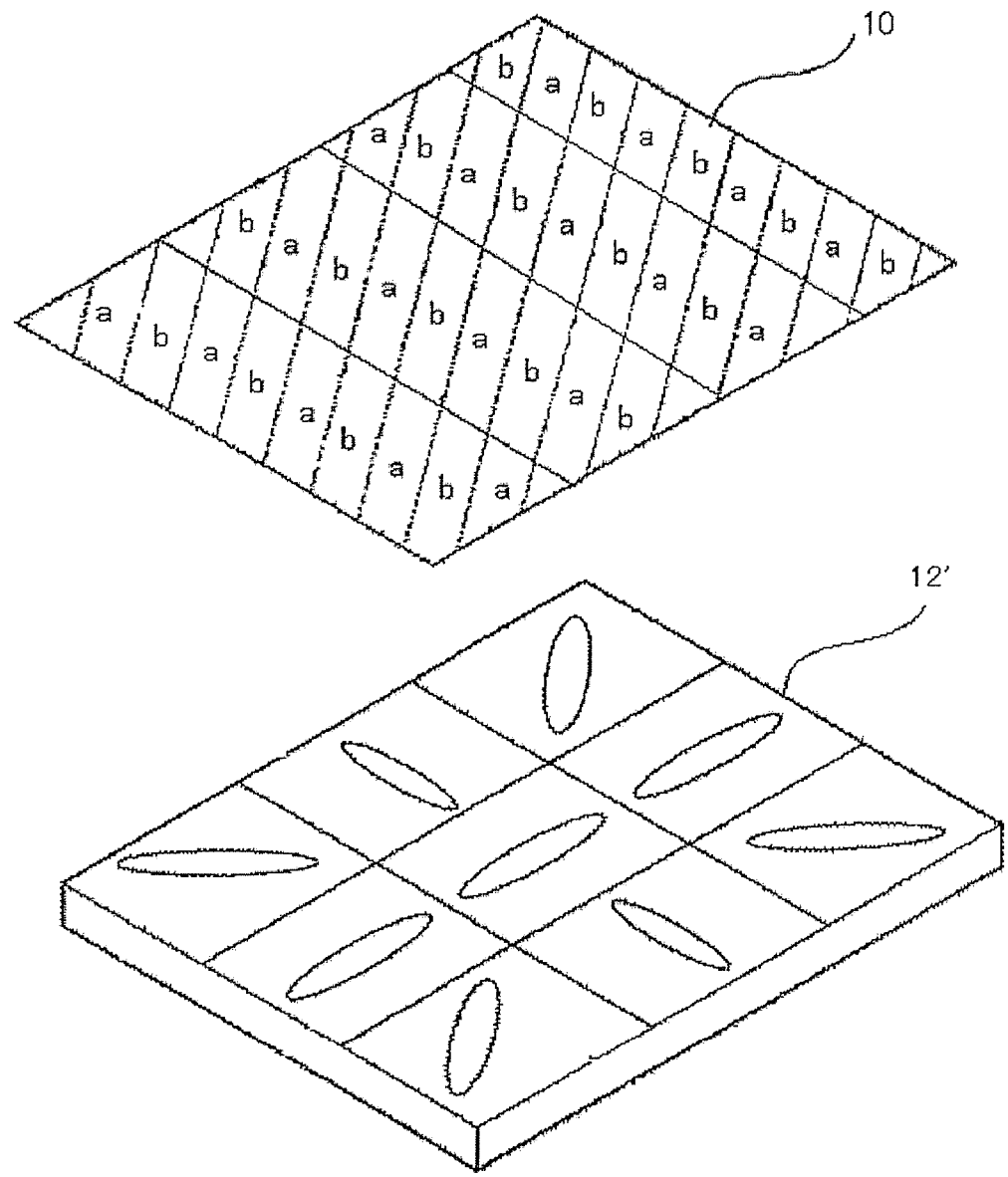
FIG. 4 is a view schematically showing another example of a combination of a transparent film and a liquid-crystal cell in the liquid-crystal display device of the invention.

FIG. 4 is an embodiment of a combination of a liquid-crystal cell 12', in which each sub-pixel RGB of the liquid-crystal cell 12' is further divided into plural domains that differ in the alignment direction of the liquid-crystal molecules therein (shown as an oval form in the drawing), and a transparent film 10. Also in the embodiment of FIG. 4, the pitch of the regularity of the domains a and b of the transparent film 10, or that is, the size of the domains a and b differs from the smallest domain of the liquid-crystal cell 12', and therefore, as a whole, the domains a and b do not correspond to the smallest domain of the liquid-crystal cell.

Not specifically defined in the invention, the size of each domain of the transparent film has no particular restriction and may be determined in consideration of the size of the domains of the liquid-crystal cell with which the transparent film is to be combined, in such a manner that the size of the domains of the transparent film may not be the same as that of the domains of the liquid-crystal cell (however, when the domain patterning differs between the two, then the size of the domains may be the same between them). Preferably, the smallest diameter of each domain of the transparent film is shorter than the smallest diameter of one pixel of the liquid-crystal cell, concretely, it is preferably from 1 to 300 μm, more preferably from 1 to 100 μm. The smallest diameter as referred to herein is as follows: When the domain is rectangular or nearly rectangular, the smallest diameter indicates the minor side of the rectangular or nearly rectangular form; and when the domain form is indefinite, then it is approximated to a circular form, and the diameter of the thus-approximated circle having an area S is taken as the smallest diameter of the domain.

In a different expression, the transparent film to be used in the invention is a transparent film of such that its Re and/or Rth vary at a pitch of from 1 to 300 nm in at least one in-plane direction, as at least two values that differ from each other. Preferably, the pitch for variation is from 1 to 100 μm.

In the above description, only embodiments in which the transparent film has two different types of domains are disclosed for simplification of the description; however, the liquid-crystal display device of the invention is not limited to these embodiments. Needless-to-say, the device of the invention may comprise a transparent film of any other type in which three or more different types of domains that differ in Re and/or Rth are aligned at random or regularly. With the increase in the types of the domains, the domains may be more averaged and the device may have a more enhanced viewing angle characteristics-improving effect. Also for the transparent film of the type having three or more different types of domains, it is desirable that each of Re and Rth values is within a range of the mean value of Re and Rth of the transparent film ±20%.

Next, the transparent film to be used in the invention and its production method will be described in detail.

The transparent film to be used in the invention is a film that transmits visible light. Concretely, the visible light transmittance of the film is preferably equal to or more than 80%. The transmittance as referred to herein is meant to indicate the ratio of the light having passed through the film toward the front thereof, to the incident light coming in the film from the back thereof.

The material of the transparent film is not specifically defined. Examples of the material to be used for producing the film include ordinary polymer film materials, such as cellulose acylates, polyolefins, polycarbonates. Also usable are curable liquid-crystal compositions heretofore used for producing optical compensatory films. In case where the film formed of such a curable liquid-crystal composition is not self-supportable, a layer of a curable liquid-crystal composition may be formed on the surface of a polymer film serving as a support. Anyhow, the transparent film may have a single-layered structure or a laminated structure. One example of a method of producing a film, of which in-plane retardation Re is adjusted to a preferred range, comprises using a curable cholesteric liquid-crystal material containing a predetermined dichroic polymerization initiator, or a discotic liquid-crystal material having a photosensitive function group(s), and carrying out irradiation of polarized light to the composition in the controlled manner. When a cholesteric phase containing a predetermined dichroic polymerization initiator is irradiated with polarized UV light, then its curing is carried out while the spiral structure of the cholesteric phase is deformed, and the thus-formed cured film may exhibit in-plane retardation Re ascribable to the cholesteric phase deformation. The Re value of the cured film, after the polarized light irradiation, may depend on the UV light intensity, the dose and the extinction coefficient in polarized UV light radiation; and therefore, the desired Re value may be achieved by controlling any one or more of those conditions. And when a liquid crystal phase containing a discotic liquid crystal compound having a photosensitive function group(s) is irradiated with polarized UV light, Re of the liquid crystal phase may be developed depending on the dose of polarized UV light. Being irradiated with polarizing UV light, the photosensitive function groups of discotic liquid crystal molecules, which are aligned along the polarization direction, may be photo-reacted selectively. And the refractive index of the photo-reacted liquid crystal phase becomes lower than that of the un-reacted liquid crystal phase. In this way, desirable Re can be obtained by irradiating a predetermined discotic liquid crystal compound with polarized UV light. According to the above mentioned methods, via a photo-mask having a predetermined pattern, the material is irradiated with polarized light under a predetermined condition, whereby domains having Re within a desired range may be formed as a predetermined pattern. The size of the domains may be controlled to a desired one by the profile of the photo-mask used.

The method of controlling Re of a cholesteric film by polarized light radiation is described in SID06 DIGEST 1539-1542; and the liquid-crystal material usable in the method is described in Proc. IDRC, Vol. 24, pp. 773-775 (2004); and these are applicable to formation of the transparent film of the invention.

One example of a method of producing a film of which thickness-direction retardation Rth is adjusted to the preferred range comprises embossing a film. Embossing is a treatment of forming a fine, continuing projection/recess pattern on the surface of a film. Rth of a film is proportional to the thickness d thereof; and therefore, for example, when a film having a uniform thickness is formed and it is embossed to form fine, continuing recesses on its surface, then Rth of the recess part is smaller than that of the projection part. Embossing to form recesses and projections gives domains a and domains b that differ in Rth thereof. The embossing step may be carried out generally by pressing an embossing ring, having an engraved pattern on its surface, against a film disposed on a metal or rubber back roll. The value Rth may be controlled by the depth of the embossing pattern engraved on the embossing ring, the pressure to be applied to the ring, and the temperature in working. The domain size may be controlled to a desired one by the embossing pattern of the embossing ring to be used in the embossing step.

The embossing technique is described in detail in JPA No. 2005-22766, paragraphs [0160] to [0166], and this is employable to the production of the transparent film in the invention.

It is also possible to adjust Rth of the optical film to the desired range according to the above mentioned method employing the discotic liquid crystal compound. In the method, Rth of the optical film is adjustable by controlling the temperature while the curing reaction such as polymerization proceeds. For example, as the curing reaction proceeds with a higher temperature, the reaction may proceed in the small-birefringent liquid crystal phase and then Rth of the cured layer may tend to be small.

More specifically, the method employing the discotic liquid crystal material will be described in detail. According to the method, it is possible to produce a film comprising plural domains that differ in Re and Rth. One example of the method is as follows. A curable composition containing at least one discotic liquid crystal compound having a photosensitive function group(s) is irradiated with non-polarized and polarized UV light via a photo-mask to carry out the curing reaction and then form an optically anisotropic layer. According to the method, it is possible to control three major refractive indexes nx, ny and nz in a domain, and therefore to produce a film comprising plural domains of which Re and Rth are adjusted to the desired ranges respectively.

When discotic liquid crystal molecules having a photosensitive function group(s) (such as a monovalent group comprising a benzene ring and a double bond conjugated with the benzene ring) are irradiated with polarized UV light, the photosensitive function groups, which are aligned along the polarization direction, are photo-reacted selectively. The refractive index in the polarization direction of the photo-reacted discotic liquid crystal phase is decreased, compared with the un-reacted discotic liquid crystal phase. An optically anisotropic layer, which is optically monoaxial, is produced by employing a discotic liquid crystal compound having a photosensitive function group(s), and then irradiated with polarized UV light in a direction, to form a biaxial optically anisotropic layer. In this way, an optically anisotropic layer, of which three major refractive indexes nx, ny and nz are controlled, exhibiting Re and Rth falling within the desired ranges respectively can be produced readily.

Combining the above methods makes it possible to produce a film having plural domains that differ in both Re and Rth thereof.

The liquid-crystal display device of the invention is not specifically defined in terms of the display mode thereof, and may be driven in any of twisted alignment mode such as TN mode, vertically aligned mode or that is, VA mode, or horizontal alignment mode such as IPS mode; and the liquid crystal display device employing any mode may achieve improvement of viewing angle characteristics.

EXAMPLES

The invention is described more concretely with reference to the following Examples, in which the material, the reagent and the substance used, their amount and ratio, and the details of the treatment may be suitably modified or changed not overstepping the sprit and the scope of the invention. Accordingly, the invention should not be limitatively interpreted by the Examples mentioned below.

[Production of Optical Film]

A transparent film was produced according to the method described in JPA No. 2002-6138 as follows.

A 5% by mass solution was prepared by dissolving polyvinyl alcohol (PVA-203 manufactured by KURARAY CO., LTD) in a mixed solvent of methanol and water (volume ratio: methanol/water was 20/80). The solution was applied to a surface of a polymer film ("Z-TAC" manufactured by FUJIFILM), which was to be a support, with a bar-coater. The coated layer was dried with a hot air of 80° C. for 10 minutes.

A solution was prepared by mixing 1.0 g of Discotic Liquid Crystal Compound (I-2) shown below with 10 mg of an additive shown below and 30 mg of a photo-polymerization initiator shown below, and then dissolving the mixture in methyl ethyl ketone.

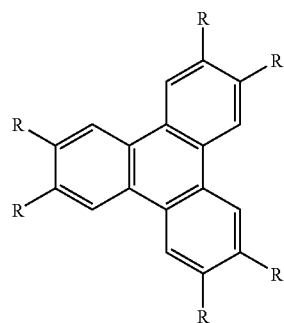

Discotic Liquid Crystal Compound (I-2)

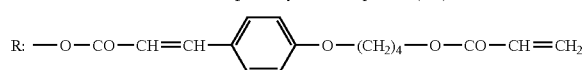

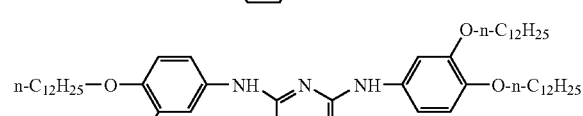

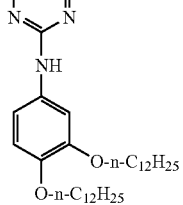

Additive

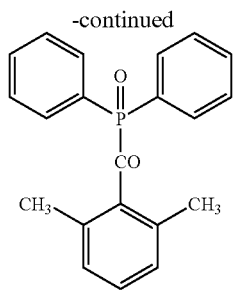

Photo-polymerization Initiator

The solution was applied to the surface of the polyvinyl-alcohol coated layer with a bar-coater. A metallic roller of which surface was heated up to a predetermined temperature was brought into contact with the rear surface, having no coated layer thereon, of the polymer film support for two minutes. The temperature of the metal roller was shown in the following Table.

Next, the coated layer (of which thickness was 2 μm) was irradiated with non-polarized UV light using a 160 W-UV light irradiator (UVL-58 manufactured by ULTRA-VIOLET PRODUCTS) for ten minutes to fix discotic liquid crystal molecules in an alignment state.

Next, the cured layer was irradiated with polarized UV light having a wavelength falling within the range from 290 to 310 nm at 20° C. using a polarized-UV light irradiator (manufactured by Nikon Technologies inc.), provided with a transparent filter and an interference filter, for a predetermined duration. The duration of irradiation was shown in the following table.

As shown in the following table, it is understandable that various films, differing in Re and/or Rth from each other, can be produced by carrying out the above mentioned steps under various conditions, such as various film-heating temperatures and/or various durations of irradiation.

It is to be noted that Re and Rth of each film was measured by setting each film in the normal alignment and in the inclined alignment by ±20 degree using a polarization microscope ("LV100POL" manufactured by Nikon) provided with an optional senarmont compensator.

The results are shown in the following table.

TABLE 1

| | Mass % of Mixture | Heating Temperature of Film (° C.) | Duration of Polarized UV Irradiation (min.) | Re (nm) | Rth (nm) |
|---|---|---|---|---|---|
| Condition 1 | 20 | 143 | 30 | 40 | 180 |
| Condition 2 | 20 | 143 | 40 | 50 | 180 |
| Condition 3 | 20 | 140 | 35 | 45 | 190 |
| Condition 4 | 20 | 137 | 30 | 40 | 200 |
| Condition 5 | 20 | 137 | 40 | 50 | 200 |
| Condition 6 | 20 | 137 | 50 | 60 | 200 |
| Condition 7 | 20 | 135 | 40 | 50 | 220 |
| Condition 8 | 20 | 135 | 50 | 60 | 220 |

Referring to the results shown above, a transparent film comprising domains 1 and domains 2 that differ in Re and/or Rth from each other, was produced as follows.

A solution of the mixture was applied to a surface of a polymer film, then heated by any temperature shown in the above table to form a coated layer, and then irradiated with non-polarized UV light via a photo-mask, transmitting non-polarized UV-light only in the predetermined areas corresponding to domains 1 (a in FIG. 1A), to cure the layer. And, subsequently, the cured layer was irradiated with polarized UV light for any duration shown in the above table to form domains 1 exhibiting predetermined Re and Rth.

After that, domains 2 were formed in the same manner of domains 1, except that the coated layer was heated by any temperature, shown in the above table, and irradiated with non-polarized light for any duration, shown in the above table, via a photo-mask transmitting non-polarized UV-light only in the predetermined areas corresponding to domains 2 (b in FIG. 1A) to cure the layer, provided that at least one of the heating temperature and the duration of irradiation was different from that in the production of domains 1.

According to the above mentioned method, various films comprising domains 1 and domains 2, of which Re and Rth were different from each other, were produced.

It is to be noted that the smallest diameters of domains 1 and 2 of each of the transparent films were 20 μm.

[Measurement of Optical Properties of Liquid Crystal Display Device]

Each of transparent films, shown in the following table, comprising domains 1 and domains 2 that differ in Re and/or Rth thereof were used as an optical compensatory film of a VA-mode liquid-crystal display device ("LG-37GE2" manufactured by Sharp Corporation), and each device was evaluated in terms of color shift and light leakage in the black state, in an oblique direction (polar angle 60°). The arrangements of domains 1 and 2 of the transparent film had no relation with the arrangement of the pixels or the sub-pixels of the liquid-crystal cell.

For comparison, a uniform film not divided into domains was used and the device was evaluated in the same manner, that is, in terms of color shift and light leakage in the black state, in an oblique direction (polar angle 60°). The results are shown in Table 2.

TABLE 2

|  | Domains 1 | | Domains 2 | | | Maximum Light |
|---|---|---|---|---|---|---|
|  | Re (nm) | Rth (nm) | Re (nm) | Rth (nm) | Color Shift *1 | Leakage *2 (%) |
| Comparative Example | 50 | 200 | — | — | 1.01 | 0.3 |
| Example 1 | 50 | 180 | 50 | 220 | 0.91 | 0.3 |
| Example 2 | 40 | 200 | 60 | 200 | 0.87 | 0.3 |
| Example 3 | 40 | 180 | 60 | 220 | 0.72 | 0.3 |
| Example 4 | 45 | 190 | 60 | 220 | 0.81 | 0.3 |

*1: Color shift observed in the oblique direction at a polar angle of 60°
*2: Maximum light leakage observed in the oblique direction at a polar angle of 60°

From the results in the above table, it is understandable that Examples 1 to 4 of the invention all had good viewing angle characteristics; and, in particular, as compared with the comparative sample, that color shift of each Example observed in the oblique direction was reduced.

Various transparent films and VA-mode liquid crystal display devices employing the films were produced in the same manner as described above, except that domains 1 and 2 having the smallest diameter of 1, 100 or 300 μm were produced in place of domains 1 and 2 having the smallest diameter of 20 μm. And the VA-mode liquid crystal display devices were evaluated in the same manner as described above. And it was found that these devices achieved the qualities equal to or similar to those shown in Table 2. From these results, it is understandable that the effect of the invention can be obtained with the domains having the smallest diameter within the range from 1 to 300 μm.

For producing plural domains in a film, the smallest diameter of 0.5 μm was too small, and such a film was not obtainable. A transparent film comprising domains 1 and 2 having the smallest diameter of 400 μm was also produced, and the VA-mode liquid crystal display device employing the film was evaluated in the same manner as described above. It was found that the images of the device were rough, which probably occurred due to interference.

Various transparent films as same as shown in FIGS. 1B, 1C and 1D, and VA-mode liquid crystal display devices employing the films were produced in the same manner as Examples 1 to 4, the films as same as shown in FIG. 1A, described above. In each of the films, domains 1 and 2 corresponded to domains a and b shown in the figures respectively. It is to be noted that, in each of the films, the smallest diameters of domains 1 and 2 were 1, 20, 100 or 300 μm. It is also noted that the total area of domains 1 and the total area of domains 2 were same among all of the films including the films produced in Examples 1 to 4.

The VA-mode liquid crystal display device employing the films were evaluated in the same manner as described above. And it was found that all of the VA-mode liquid crystal devices achieved the qualities equal to or similar to those shown in Table 2 regardless of the smallest diameters of the domains.

INDUSTRIAL APPLICABILITY

According to the invention, there is provided a liquid-crystal display device that is excellent in the production aptitude and is excellent in the viewing angle characteristics (especially in that color shift and light leakage in the black state are small).

What is claimed is:

1. A liquid-crystal display device comprising:
a liquid-crystal cell with plural domains and
a transparent film comprising at least two domains that differ in in-plane retardation (Re) and/or thickness-direction retardation (Rth) for a visible light wavelength λ nm,
wherein the domains of the transparent film differ from the domains of the liquid-crystal cell in terms of their arrangement and/or size;
wherein Re and Rth of the domains of the transparent film at a visible light wavelength λ nm are within a range of the mean value ±20% of Re and Rth, respectively, of the transparent film at the same wavelength; and
wherein the transparent film comprises plural domains having Re at a visible light wavelength λ nm of from 40 to 50 nm, and plural domains having Re at the same wavelength of from 50 to 60 nm; or the transparent film comprises plural domains having Rth at a visible light wavelength λ nm of from 180 to 200 nm, and plural domains having Rth at the same wavelength of from 200 to 220 nm.

2. The liquid-crystal display device of claim 1, wherein the domains of the transparent film are aligned in a lattice arrangement.

3. The liquid-crystal display device of claim 1, wherein the smallest diameter of the domains of the transparent film, in the plane of the transparent film, is from 1 μm to 300 μm.

* * * * *